(12) United States Patent
Petruzzelli (10) Patent No.: US 10,310,498 B2
(45) Date of Patent: Jun. 4, 2019

(54) UNMANNED AERIAL VEHICLE TRANSPONDER SYSTEMS WITH INTEGRATED DISABLEMENT

(71) Applicant: Echostar Technologies L.L.C., Englewood, CO (US)

(72) Inventor: Edmund Petruzzelli, Centennial, CO (US)

(73) Assignee: EchoStar Technologies International Corporation, Englewood, CO (US)

(*) Notice: Subject to any disclaimer, the term of this patent is extended or adjusted under 35 U.S.C. 154(b) by 0 days.

(21) Appl. No.: 15/184,555

(22) Filed: Jun. 16, 2016

(65) Prior Publication Data

US 2017/0364065 A1    Dec. 21, 2017

(51) Int. Cl.
| | |
|---|---|
| *G05D 1/00* | (2006.01) |
| *G08G 5/00* | (2006.01) |
| *H04B 1/02* | (2006.01) |
| *H04B 1/06* | (2006.01) |
| *B64C 39/02* | (2006.01) |

(Continued)

(52) U.S. Cl.
CPC .......... *G05D 1/0011* (2013.01); *B64C 39/024* (2013.01); *F41H 11/02* (2013.01); *G08G 5/006* (2013.01); *G08G 5/0021* (2013.01); *G08G 5/0026* (2013.01); *G08G 5/0069* (2013.01); *G08G 5/0082* (2013.01); *H04B 1/02* (2013.01);
(Continued)

(58) Field of Classification Search
None
See application file for complete search history.

(56) References Cited

U.S. PATENT DOCUMENTS

| | | | | |
|---|---|---|---|---|
| 3,037,722 A | * | 6/1962 | Gerstenberger | ........ B64C 27/30 244/17.13 |
| 3,738,594 A | * | 6/1973 | Donovan | ................ B64C 13/00 244/183 |

(Continued)

FOREIGN PATENT DOCUMENTS

EP    2 979 979 A1    2/2016

OTHER PUBLICATIONS

US 9,601,023 B2, 03/2017, Yu (withdrawn)*

(Continued)

*Primary Examiner* — Jean Paul Cass
(74) *Attorney, Agent, or Firm* — Kilpatrick Townsend & Stockton LLP (57) ABSTRACT

Various systems and methods for disabling UAVs are presented. An interrogation system may transmit an identifier request message to a UAV. The interrogation system may receive, in response to the identifier request message, a response message that indicates a UAV identifier. The interrogation system may access one or more UAV identifier databases that relate UAV identifiers with airspace definitions. The interrogation system may retrieve from the one or more UAV identifier database systems an airspace definition corresponding to the UAV identifier. The interrogation system may determine that the UAV is to be disabled based on: a location of the UAV, a restricted airspace definition, and the airspace definition corresponding to the UAV identifier. The interrogation system may then transmit a disablement instruction message to the UAV based on the location of the UAV and the airspace definition corresponding to the UAV identifier.

18 Claims, 6 Drawing Sheets

(51) Int. Cl.
  *B64D 45/00* (2006.01)
  *F41H 11/02* (2006.01)
  *H04L 29/08* (2006.01)
(52) U.S. Cl.
  CPC .............. *H04B 1/06* (2013.01); *H04L 67/12* (2013.01); *B64D 2045/0055* (2013.01)

(56) References Cited

U.S. PATENT DOCUMENTS

| | | | | |
|---|---|---|---|---|
| 7,183,946 | B2* | 2/2007 | Boudrieau | B64D 45/0015 244/189 |
| 9,524,648 | B1* | 12/2016 | Gopalakrishnan | B64C 39/00 |
| 2004/0107027 | A1* | 6/2004 | Boudrieau | B64D 45/0015 701/1 |
| 2006/0032978 | A1* | 2/2006 | Matos | B64D 45/0015 244/118.5 |
| 2007/0018033 | A1* | 1/2007 | Fanucci | F42B 10/143 244/3.27 |
| 2007/0048084 | A1* | 3/2007 | Jung | G09F 9/30 404/9 |
| 2007/0210953 | A1* | 9/2007 | Abraham | G08G 5/0069 342/29 |
| 2010/0017114 | A1* | 1/2010 | Tehan | G01C 21/00 701/423 |
| 2010/0282941 | A1* | 11/2010 | Mosier | G01S 17/66 250/203.1 |
| 2010/0282942 | A1* | 11/2010 | Mosier | F41H 13/005 250/203.2 |
| 2010/0283988 | A1* | 11/2010 | Mosier | F41G 1/34 356/4.01 |
| 2012/0097800 | A1* | 4/2012 | Burroughs | B64C 13/12 244/197 |
| 2014/0249693 | A1 | 9/2014 | Stark et al. | |
| 2015/0254988 | A1* | 9/2015 | Wang | G05D 1/0214 701/3 |
| 2015/0346722 | A1 | 12/2015 | Herz et al. | |
| 2015/0348424 | A1 | 12/2015 | Duffy et al. | |
| 2016/0070265 | A1 | 3/2016 | Liu et al. | |
| 2016/0117929 | A1 | 4/2016 | Chan et al. | |
| 2016/0196750 | A1* | 7/2016 | Collins | B64C 39/024 701/14 |
| 2016/0244161 | A1* | 8/2016 | McClure | B64C 39/024 |
| 2016/0244187 | A1* | 8/2016 | Byers | B64C 39/024 |
| 2016/0246297 | A1* | 8/2016 | Song | G05D 1/0022 |
| 2016/0274578 | A1* | 9/2016 | Arwine | H04L 63/0823 |
| 2016/0275801 | A1* | 9/2016 | Kopardekar | G08G 5/0043 |
| 2016/0299506 | A1* | 10/2016 | Bruggeman | B64D 31/06 |
| 2016/0307449 | A1* | 10/2016 | Gordon | G08G 5/0069 |
| 2016/0327956 | A1* | 11/2016 | Zhang | B64C 39/024 |
| 2016/0364989 | A1* | 12/2016 | Speasl | G08G 5/0034 |
| 2017/0021925 | A1* | 1/2017 | Weller | G06F 11/00 |
| 2017/0039765 | A1* | 2/2017 | Zhou | G06T 19/006 |
| 2017/0064259 | A1* | 3/2017 | Bostick | G06K 9/0063 |
| 2017/0069214 | A1* | 3/2017 | Dupray | G08G 5/0021 |
| 2017/0076610 | A1* | 3/2017 | Liu | B64C 39/024 |
| 2017/0301220 | A1* | 10/2017 | Jarrell | H04W 4/70 |
| 2017/0364065 | A1* | 12/2017 | Petruzzelli | B64C 39/024 |
| 2017/0372617 | A1* | 12/2017 | Bruno | G08G 5/0039 |

OTHER PUBLICATIONS

US 9,601,023, 3/2015, Lance Taylor (withdrawn).*
NoFlyZone, retrieved from https://www.noflyzone.org/ Accessed on Jun. 15, 2016, 2 pages.
Identification Friend or Foe (IFF) Systems, IFF Questions & Answers. Retrieved from http://www.dean-boys.com/extras/iff/iffqa.html. Accessed on Jun. 15, 2016, 6 pages.
International Search Report and Written Opinion for PCT/US2017/034926 dated Aug. 30, 2017, all pages.
International Preliminary Report on Patentability for PCT/US2017/034926 dated Dec. 18, 2018, all pages.

* cited by examiner

UNMANNED AERIAL VEHICLE TRANSPONDER SYSTEMS WITH INTEGRATED DISABLEMENT

BACKGROUND

Unmanned aerial vehicles (UAVs), also commonly referred to as drones, allow a remote pilot to control the UAV via wireless communication. UAVs have many legitimate commercial, military, and recreational uses, including surveillance, photography, videography, and entertainment. However, when UAVs are operated in an irresponsible or inappropriate way, UAVs can be dangerous or intrusive. For example, when operated near other aircraft, a UAV can be ingested into an engine or otherwise strike the aircraft, potentially resulting in a catastrophic crash. As another example, even if no other aircraft are in the vicinity, UAVs may be inappropriately operated in areas where privacy or secrecy is of concern, such as near sensitive government or commercial facilities.

SUMMARY

Various systems, methods, and devices for interrogating and disabling an unmanned aerial vehicle (UAV) are presented. An airspace management system may transmit an identifier request message to the UAV via a wireless transmitter of a ground-based interrogation system. The UAV may be piloted using a remote pilot system distinct from the ground-based interrogation system. The airspace management system may receive, in response to the identifier request message, a response message using a wireless receiver, the response message comprising a UAV identifier, wherein the UAV identifier distinguishes the UAV from other UAVs. The airspace management system may access one or more UAV identifier database systems that relate UAV identifiers with airspace definitions. The airspace management system may retrieve from the one or more UAV identifier database systems an airspace definition corresponding to the UAV identifier. The airspace management system may determine that the UAV is to be disabled based on: a location of the UAV, a restricted airspace definition, and the airspace definition corresponding to the UAV identifier. The airspace management system may transmit a disablement instruction message to the UAV via the wireless transmitter based on determining that the UAV is to be disabled based on the location of the UAV and the airspace definition corresponding to the UAV identifier.

Embodiments of such systems, methods, and devices may include one or more of the following features: The UAV may deactivate, in response to the disablement instruction message, control of the UAV from a remote pilot system. The UAV may execute a UAV disablement procedure. A local UAV identifier database of the ground-based interrogation system may be accessed that defines airspace definitions. A global restricted-access UAV database may also be accessed. The airspace management system, may transmit login credentials to the global restricted-access UAV database. The airspace management system may retrieve from the global restricted-access UAV database an encryption key specific to the UAV identifier. The disablement instruction message transmitted to the UAV is encrypted using the encryption key specific to the UAV identifier retrieved from the global restricted-access UAV database. The airspace management system may select a specific type of disablement selected from a plurality of types of disablement, wherein the disablement instruction message transmitted to the UAV indicates the specific type of disablement selected from the plurality of types of disablement. The airspace definition may define a standardized list of airspaces in which the UAV is not permitted to fly. The airspace definition may further define one or more exceptions to the standardized list of airspaces, the one or more exceptions defining one or more restricted airspaces in which the UAV is permitted to fly.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ability to interrogate, receive a response, and command a UAV may allow sensitive entities a more effective way of handling UAVs that encroach on their airspace. Locations such as airports, government installations, public events (e.g., sporting events, airshows, concerts) and commercial facilities may be sensitive to nearby UAVs from public safety and/or privacy standpoints. In embodiments detailed herein, a transponder system is detailed in which a ground-based interrogation system can request an identifier from a UAV. In response, the UAV provides an identifier that distinguishes the UAV from other UAVs (e.g., within a country, a jurisdiction, or the world). The ground-based interrogation system can then determine if the UAV should be permitted to fly in its current location. This can involve the ground-based interrogation system determining a location of the UAV and accessing one or more databases to determine if the UAV is flying within permitted airspace for the UAV.

If a UAV is determined to be flying in restricted airspace and the UAV does not have an exemption permitting the UAV to fly within the restricted airspace, the UAV may be disabled. Such disablement may involve the ground-based interrogation system sending a disablement message to the UAV. The UAV may have an on-board disablement procedure stored (e.g., in read-only memory) that at least partially overrides a pilot's control of the UAV and causes a particular action to occur, such as: the power of the UAVs propulsion and/or control systems to gradually decrease (a forced landing), the power to the UAV's propulsion system and/or control systems to be ceased (a forced crash), a parachute to be deployed, the ground-based interrogation system to assume control of the UAV, altitude of the UAV to be decreased to below a defined ceiling, or the UAV being instructed to retrace its flightpath for a distance or time.

The UAV may be manufactured such that it is required to communicate with the ground-based interrogation system via the transponder system. That is, UAVs may be required to have an on-board transponder system incorporated and, possibly, disabled in response to an authorized disablement message. To prevent unauthorized persons from sending disablement messages to UAVs, each UAV may be associated with one or more encryption keys or codes. These encryption keys can be stored in an Internet-accessible database that is accessible to only authorized users or systems. For instance, an airport's flight controller may have access to the database, but members of the general public would not. By interrogating the database with the UAV's identifier, an encryption key (or other form of code) associated with the UAV may be obtained. This encryption key may be used to encode the disablement message. The UAV may use the same encryption key or a corresponding description key to decrypt the message and execute a disablement procedure in response to the disablement message. In other embodiments, rather than an encryption key, a code specific to the UAV may be retrieved that can be transmitted as part of the disablement message. Presence of this code authorizes the UAV to disable in response to the UAV disablement message.

Figure 1:
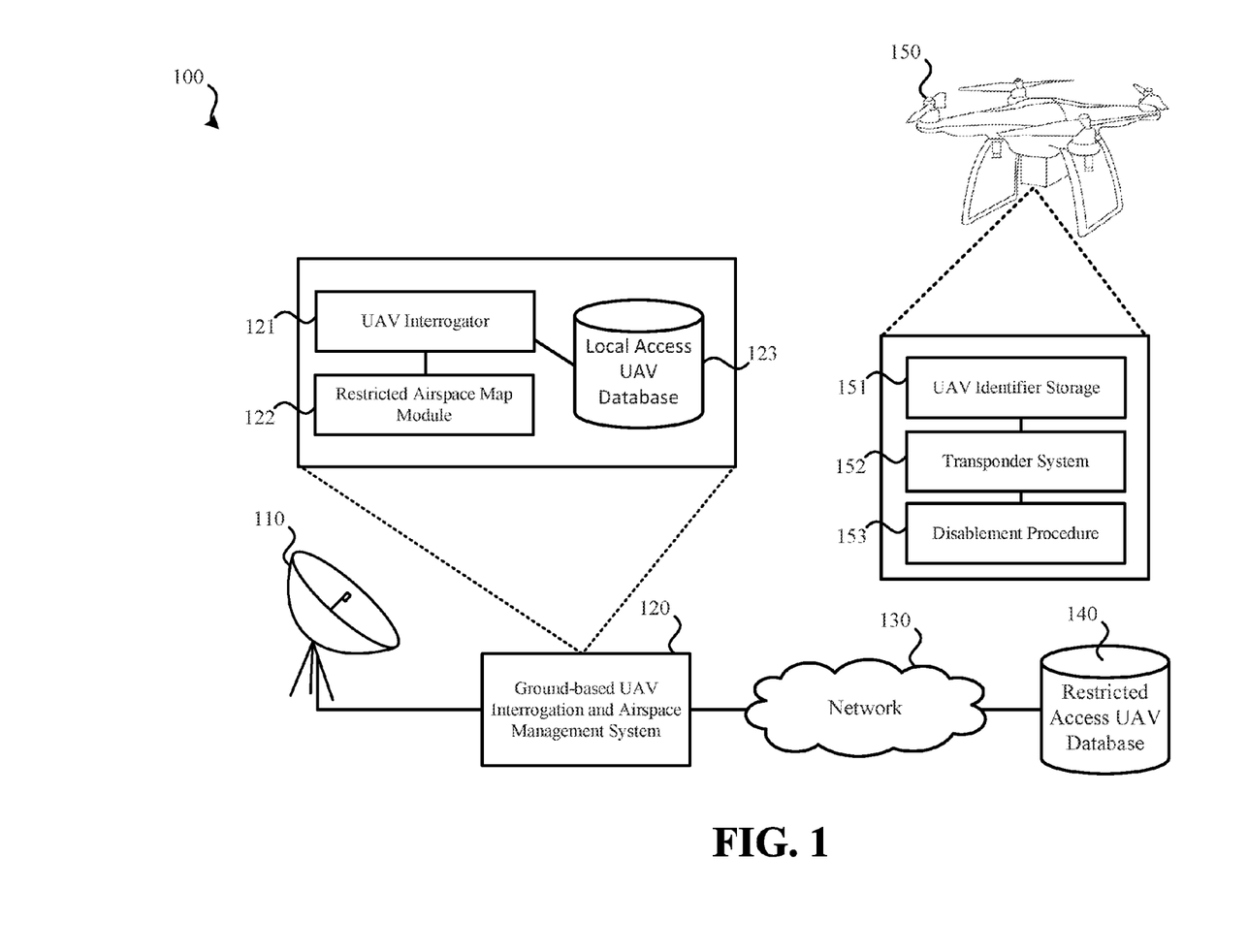
FIG. 1 illustrates an embodiment of a system for interrogating and disabling an unmanned aerial vehicle (UAV).

The above description generally outlines some of the features of the UAV transponder arrangements having integrated disablement detailed herein. Further detail and embodiments are provided in relation to the figures. FIG. 1 illustrates an embodiment of a system for interrogating and disabling an unmanned aerial vehicle (UAV). System 100 may include: wireless transceiver 110 (which can include a wireless transmitter and wireless receiver), ground-based UAV interrogation and airspace management system 120 ("management system"), network 130, restricted access UAV database 140, and UAV 150.

Transceiver 110, which may include a wireless transmitter and a wireless receiver, may transmit request messages on a particular frequency or frequency band. The frequency may be defined such that all UAVs that operate within a particular jurisdiction are configured to receive such request messages on the frequency or frequency band. Transceiver 110 may also be configured to receive responses from UAVs and provide such responses to ground-based UAV interrogation and airspace management system 120.

Ground-based UAV interrogation and airspace management system 120 may include multiple components, including: UAV interrogator 121, restricted airspace map module 122, and local access UAV database 123. Ground-based UAV interrogation and airspace management system 120 may include one or more computers or computer server systems. In some embodiments, ground-based UAV interrogation and airspace management system 120 may be local to transceiver 110; in other embodiments, ground-based UAV interrogation and airspace management system 120 may communicate using a network with transceiver 110, thus allowing management system 120 to be remotely located (e.g., "in the cloud"). UAV interrogator 121 may be configured to cause transceiver 110 to request an identifier from all UAVs within communication range of wireless transceiver 110. In response, UAV interrogator 121 may receive one or more UAV identifiers, depending on the number of UAVs in the area. Wireless transceiver 110 may be positioned and powered such that wireless transceiver 110 can communicate with any UAVs located within a restricted airspace controlled by management system 120. Wireless transceiver 110 may be within or outside of the restricted airspace. Further, wireless transceiver 110 may be positioned and powered such that wireless transceiver 110 can communicate with UAVs located outside the restricted airspace. As such, some UAVs with which wireless transceiver 110 requests a UAV identifier may be flying in unrestricted airspace outside of restricted airspace.

Management system 120 may include a definition of a restricted airspace, as stored by restricted airspace map module 122. Restricted airspace map module 122 may define an airspace within which UAV flight is generally not permitted. In some embodiments, restricted airspace map module 122 may define an altitude in addition to coordinates. For example, UAV flight may only be restricted above or below a particular altitude.

Local access UAV database 123 may contain identifiers for one or more UAVs which are exempted from the restricted airspace defined within restricted airspace map module 122. That is, if a UAV identifier is received by wireless transceiver 110 and determined by UAV interrogator 121 to be present within local access UAV database 123 and associated with an exemption for the restricted airspace, the UAV may be permitted to continue its flight and no further action may be taken by management system 120 to disable the UAV.

Management system 120 may operate autonomously or with an authorized user's input. During autonomous operation, management system 120 may interrogate and disable UAVs without input from an authorized user. In other embodiments or in a different operating mode, management system 120 may require an authorized user's input in order to: 1) interrogate one or more UAVs; and/or 2) disable one or more UAVs. For example, it may be efficient for management system 120 to autonomously interrogate UAVs but allow an authorized user a final decision as to whether an unauthorized UAV should be disabled by management system 120.

Management system 120 may be in communication with network 130. Network 130 may represent an amalgamation of more than one wireless and/or wired networks. Network 130 may represent or include the Internet. Network 130 may permit management system 120 to communicate with restricted access UAV database 140.

Restricted access UAV database 140 may represent a database maintained by a database system remote from management system 120 which management system 120 can access in order to determine information about UAVs based on UAV identifiers. Restricted access UAV database 140 can be understood as a global database that contains information related to many or all UAVs located within a particular jurisdiction. For example, manufacturers of UAVs in a given jurisdiction may be required to supply various information about a UAV, including the UAVs identifier, owner, make, and model, to an entity that maintains restricted access UAV database 140.

Various systems in addition to management system 120 may be permitted to access restricted access UAV database 140. For example, if management system 120 is located in an airport, other airports or other types of facilities with a similar system may also be permitted to access restricted access UAV database 140. Restricted access UAV database 140 may be understood as restricted because valid login credentials to access the database may be required. As such, ordinary members of the public may not be permitted to access restricted access UAV database 140. For example, only entities that manage airspace relevant to public safety and national security may be permitted access to restricted access UAV database 140.

Restricted access UAV database 140 may contain various fields related to each UAV identifier for which information is stored. Table 1, represented below, provides a possible embodiment of a few entries of restricted access UAV database 140. It should be understood that Table 1 and the data contained in the entries and the fields included in Table 1 are merely exemplary.

and/or other entities may be exempted from such user-submitted restricted airspace definitions. In some instances, only commercial and/or private UAVs may be restricted by such a user-defined restricted airspace.

In some embodiments, information may be coded directly into the UAV's identifier. This information, without a lookup in a database that stores information about individual UAVs being performed, may allow management system 120 to ascertain information about the UAV. For example, coded directly into identifier of the UAV may be a UAV classifi-

TABLE 1

| UAV Identifier | Exemptions | Encryption Key | Disablement Entity | Disablement Event | Date/Time | Owner Details |
|---|---|---|---|---|---|---|
| 34:5F:A9:8C:21 | None | 2349348 | DIA Int'l Airport | Restricted Airspace Violation | Apr. 27, 2016 2:27 PM | Brian Rodgers 933 N. Lowell. St. Denver, CO |
| 27:12:BB:90:23 | B342, C112 | 6534954 | — | — | — | Joseph Hogan 123 Main St. Dover, NH |
| 13:42:FA:27:CB | C112 | 0392493 | — | | | William Doe 27 Windward Rd. Seattle, WA |

Table 1 illustrates various fields which may be stored using restricted access UAV database 140. UAV identifier may refer to a unique identifier that distinguishes a particular UAV from other UAVs globally or in a particular jurisdiction. Exemptions may identify particular restricted airspaces in which the UAV is permitted to fly. Restricted access UAV database 140 may store a standard definition of restricted airspaces in which UAVs are typically not permitted to fly. Exceptions to this standard definition may be defined via such exemptions. Codes present in an exemption field may refer to particular sets of coordinates stored elsewhere that define the restricted airspace in which the UAV is permitted to fly. Encryption key may be used to encrypt a message to be transmitted to the UAV, such as a disablement message. When such a message is received by the UAV and properly encrypted, the UAV identifies the message as valid and authentic. In some embodiments, rather than encryption key, a code, which is maintained in secret, may be transmitted with a disablement message. Presence of the code or use of the encryption key signifies to the UAV that the disablement message is valid.

In some embodiments, it may be possible for members of the public to submit airspace definitions to restricted access UAV database 140. For example, certain jurisdictions may give property owners the right to restrict airspace to UAVs generally or certain classes of UAVs (e.g., non-governmental UAVs) above the owner's property. An Internet-accessible user interface in communication with restricted access UAV database 140 may permit a user to submit an address or property boundary definition for which the user has ownership or other administration rights. A computerized system associated with restricted access UAV database 140 may receive the user's request, verify that the user has the necessary rights to restrict airspace over a property or region (e.g., that the user is the landowner and the jurisdiction in which the property is located allows such restriction), and identify a geographic region of the property (e.g., by accessing a property database for a jurisdiction to correlate an address with a coordinates). A restricted airspace, possibly up to a particular altitude, may be defined based on the user submission and stored in restricted access UAV database 140. UAVs that are operated by the government, military, cation. The UAV classification may designate whether the UAV is a military, a commercial, or a consumer UAV (alternate or additional categories are also possible). In some embodiments, based on such a classification, management system 120 may permit access or issue a disablement message. For example, military UAVs may also be permitted but consumer UAVs may always be banned from a particular airspace controlled by management system 120. Another piece of information that may be coded directly into the UAV identifier may be a make and/or model of the UAV. Management system 120 may use this information to determine if the UAV might be permitted in the airspace. For example, based on a make and model, management system 120 may determine if a UAV is civilian or military. In some embodiments, a user may program a UAV with his name, address, and contact information such that this information is transmitted as part of the UAV's identifier. Once programmed into the UAV, this information may not be editable. The UAV may then transmit this information the management system 120 in response to a query, thus passing information about the pilot or owner of the UAV to management system 120 without a database lookup being required. As an example of an identifier that includes some of the above information, a UAV identifier may be: "239984732_CONSUMER_JOHN.DOE_72_WINDWARD_ROAD_DOVER_NH." The first portion of the identifier may be used for a database lookup, the second portion may specify that the UAV is a consumer UAV (as opposed to commercial, military, or government, and the third portion may specify the owner's name and home or registration address.

Disablement entity, disablement event, and disablement date/time refer to data field entries which may be made by the management system, such as management system 120, in restricted access UAV database 140 in response to management system 120 issuing a disablement message to a particular UAV. As such, management system 120 may write data indicative of the disablement event to restricted access UAV database 140. This may create a record of the disablement for future reference and/or for reporting to the UAV's owner and/or local police. Local access UAV database 123 may be similar to restricted access UAV database 140, but may only store information about UAVs that have an exemption for operating within a restricted airspace controlled by management system 120.

UAV 150 represents an exemplary UAV. UAV 150 may be piloted by a pilot using a pilot control system (not illustrated) distinct from management system 120. That is, the pilot control system used to control UAV 150 may have no direct communication with or relation to management system 120. Further, wireless transceiver 110 may communicate using a different frequency with UAV 150 than the pilot control system used to wirelessly control UAV 150. UAVs may be manufactured with certain required equipment onboard, such as: UAV identifier storage 151, transponder system 152, and disablement procedure module 153. UAV identifier storage 151 and disablement procedure module 153 may be read-only, such that a pilot or user of UAV 150 cannot modify the UAVs' identifier or the UAVs' one or more disablement procedures.

UAV identifier storage 151 may store the identifier of the UAV onboard UAV 150. This UAV identifier may correspond to an entry within restricted access UAV database 140. Upon purchasing or registering UAV 150, the purchaser may be required to provide information used to populate restricted access UAV database 140, such as an owner's name and address. Transponder system 152 may be configured to receive identifier requests from various management systems such as management system 120 communicating with UAV 150 via wireless transceiver 110. In response to transponder system 152 receiving an identifier request from wireless transceiver 110, transponder system 152 may retrieve the UAV identifier from UAV identifier storage 151 and transmit the UAV identifier in response to the request. The same or different frequency may be used for the response as was used for the request.

Transponder system 152 may also be in communication with a disablement procedure module 153. Transponder system 152 may be configured to activate disablement procedure module 153 only in particular situations. Transponder system 152 may be required to receive a disablement request from an authorized management system, such as management system 120. Transponder system 152 may determine the veracity of the disablement request based on an encryption key used to encrypt the request and/or code included in the disablement request. This encryption key or code may have been retrieved by management system 120 from restricted access UAV database 140 (or a local database). Therefore, upon manufacture, a manufacturer of UAV 150 may have hardcoded in a corresponding encryption key and/or code to UAV 150 and may have provided the encryption key and/or code to restricted access UAV database 140.

Disablement procedure module 153 may store multiple disablement procedures. Based on a received disablement procedure message, the specific disablement procedure performed may be varied. For instance, disablement procedures may include: (1) gradually decreasing power to a propulsion/lift system of the UAV; (2) cutting power to the propulsion/lift system of the UAV; (3) flight path reversal, which may require the UAV to retrace its flight path for a specific distance, amount of time, or until the restricted airspace is exited; (4) a parachute being deployed; (5) adjusting the altitude of the UAV to above or below a floor or ceiling; or (6) the management system assuming control of the UAV. Regardless of the disablement procedure engaged, the system used by the pilot to control the UAV may be disabled.

Figure 2:
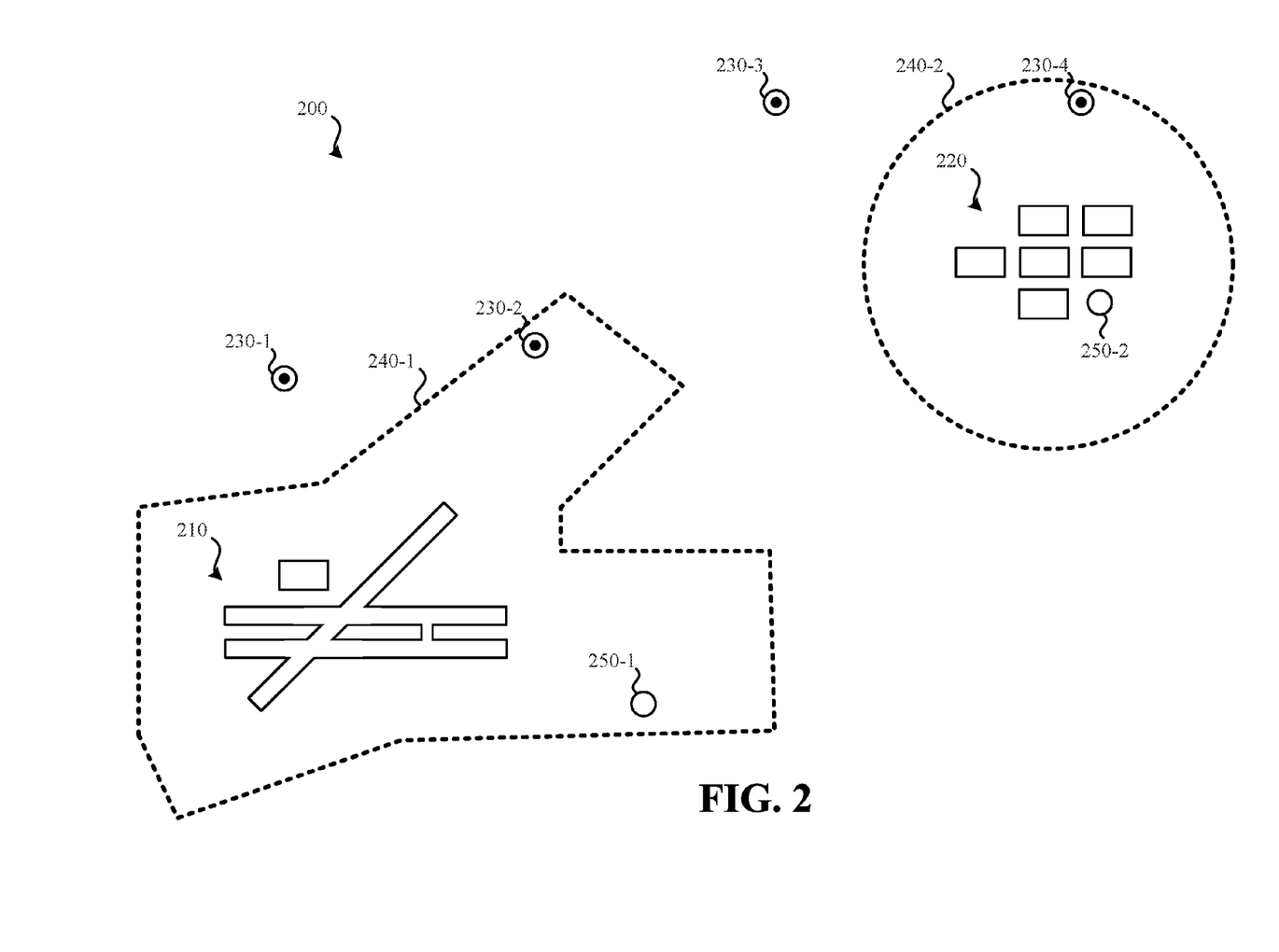
FIG. 2 illustrates an exemplary map of UAVs moving in and around restricted airspace.

FIG. 2 illustrates an exemplary map 200 showing UAVs flying in and around restricted airspace. On map 200, an airport 210 and government facility 220 are illustrated. These facilities are exemplary locations where the flight of UAVs may be restricted. UAVs 230 (which include UAVs 230-1, 230-2, 230-3, and 230-4) are operating in the general vicinity of airport 210 and government facility 220, both within restricted airspace and outside of restricted airspace. Restricted airspace around airport 210 is defined as restricted airspace 240-1, represented by a dotted line. Restricted airspace around government facility 220 is defined as restricted airspace 240-2, also represented by a dotted line.

UAV 230-1 is operating outside of restricted airspace 240-1 and outside of restricted airspace 240-2; as such, UAV 230-1 is allowed to be controlled by the UAV's pilot via the UAV's pilot control system. Outside of restricted airspaces 240, one or more management systems and associated transceivers (e.g., 250-1, 250-2) may interrogate the transponder system of UAV 230-1 and may determine the location of UAV 230-1; however, no disablement message may be issued by a management system. The location of UAV 230-1 may be determined by a management system, such as system 250-1 and its associated transponder system 110, or may be reported by UAV 230-1 in response to an identifier request message. UAV 230-1 may have an onboard global navigation satellite system (GNSS) module, such as a GPS receiver, through which the GPS can determine its absolute location.

UAV 230-2 is operating within restricted airspace 240-1. As such, system 250-1 may, in response to interrogating UAV 230-2, transmit a disablement message that causes UAV 230-2 to no longer be controlled by the pilot of UAV 230-2. Alternatively, UAV 230-2 may be permitted to fly within restricted airspace 240-1. In response to an identifier request message, system 250-1 may receive the identifier of UAV 230-2. This identifier may be used to access a local access UAV database maintained by system 250-1 and/or restricted access UAV database 140 which may be accessible via the Internet to determine if UAV 230-2 is authorized to fly within restricted airspace 240-1.

UAV 230-3 is operating outside of restricted airspace 240-1 and outside of restricted airspace 240-2; as such, UAV 230-3 is allowed to be controlled by the UAV's pilot via the UAV's pilot control system. Outside of restricted airspaces 240, one or more management systems and associated transceivers such as both of systems 250-1 and 250-2 may interrogate the transponder system of UAV 230-3 and may determine the location of UAV 230-3. No disablement message may be issued by either of systems 250 due to UAV 230-3 being outside of both restricted airspaces.

UAV 230-4 is operating within restricted airspace 240-2 but outside restricted airspace 240-1. As such, system 250-2 may, in response to interrogating UAV 230-2, transmit a disablement message that causes UAV 230-4 to no longer be controlled by the pilot of UAV 230-4. System 250-1 may interrogate the transponder system of UAV 230-4, but may permit the UAV to continue to fly due to UAV 230-4 being outside of restricted airspace 240-1. Alternatively, UAV 230-4 may be permitted to fly within restricted airspace 240-2. In response to an identifier request message, system 250-2 may receive the identifier of UAV 230-4. This identifier may be used to access a local access UAV database maintained by system 250-1 and/or restricted access UAV database 140 which may be accessible via the Internet to determine if UAV 230-2 is authorized to fly within restricted airspace 240-2. In this example, UAV 230-4 has an entry in restricted access UAV database 140 that permits it to fly in restricted airspace 240-2.

While FIG. 2 illustrates two separate systems 250 that are responsible for their respective restricted airspaces 240, in other embodiments a single system 250-1 may monitor and issue disablement messages for multiple restricted airspaces, such as system 250-1 handling interrogation and disablement for both restricted airspaces 240-1 and 240-2.

Figure 3:
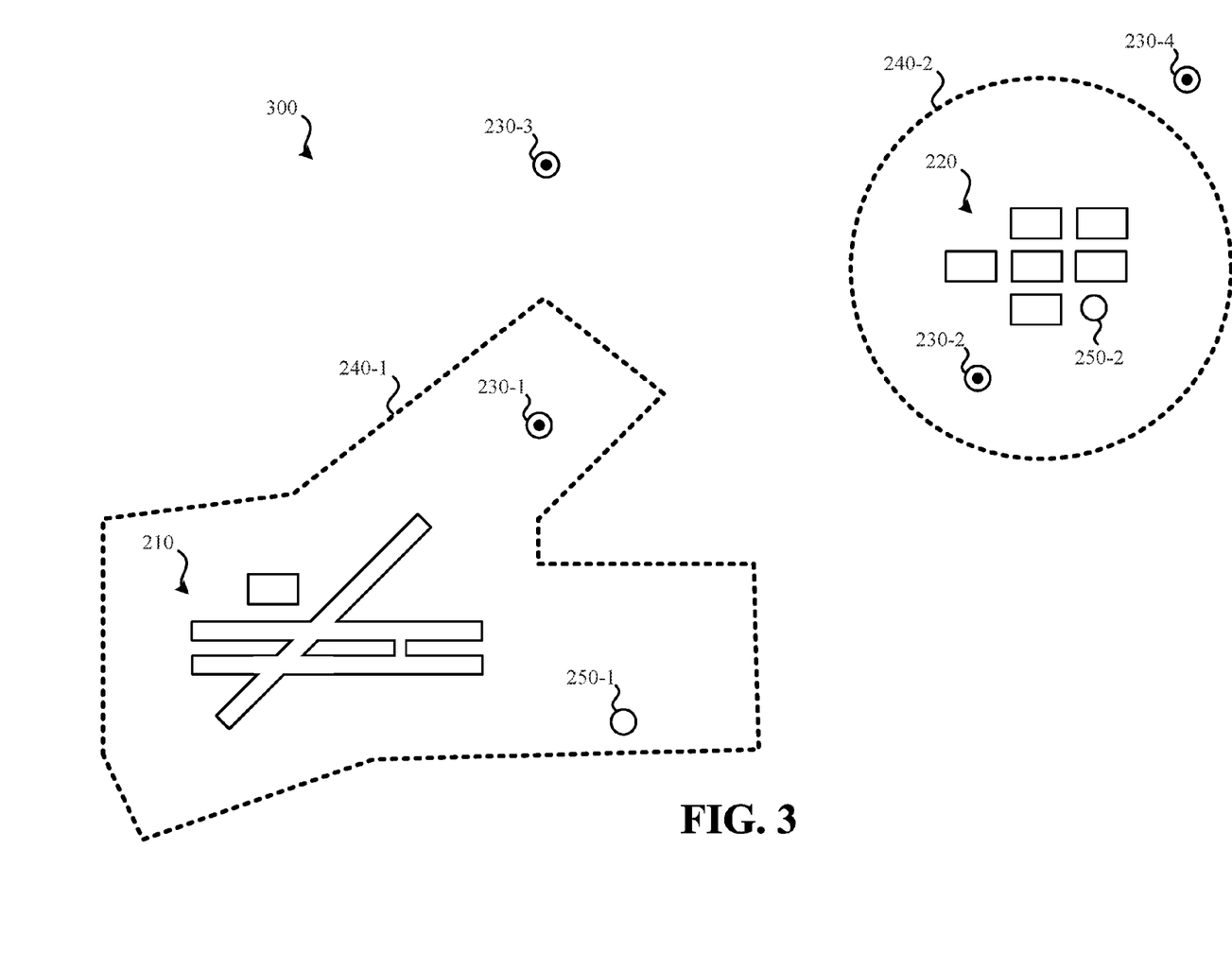
FIG. 3 illustrates another exemplary map of UAVs moving in and around restricted airspace.

FIG. 3 illustrates another exemplary map 300 showing the UAVs of FIG. 2 flying in and around restricted airspace. Map 300 shows that UAV 230-1 has flown within restricted airspace 240-1. In this example, UAV 230-1 does not have an exemption to fly within restricted airspace 240-1. As such, once system 250-1 has checked a local access UAV database and/or a restricted access UAV database, a disablement message may be transmitted to UAV 230-1. This may cause the UAV to land, crash, or retrace its flight path, such as to the location shown for UAV 230-1 in FIG. 2, which may be at least a predefined distance outside of restricted airspace 240-1. In addition or alternately to disabling UAV 230-1, an entry may be made to restricted access UAV database 140 indicating the circumstances of the restricted airspace violation. This information may be used to question, fine, and/or otherwise punish the pilot of UAV 230-1.

UAV 230-2 has left restricted airspace 240-1 and has entered restricted airspace 240-2. UAV 230-2 having an exemption to fly in restricted airspace 240-1 does not necessarily mean that UAV 230-2 has an exemption to fly within restricted airspace 240-2. If UAV 230-2 does not have its identifier associated with an exemption for restricted airspace 240-2 in either a local access UAV database of system 250-2 or restricted access UAV database, UAV 230-2 may be issued a disablement message by system 250-2 and/or an entry documenting the violation may be made to restricted access UAV database 140.

UAV 230-3 has left restricted airspace 240-1 and may continue to have its transponder system interrogated by system 250-1 and 250-2, such as to determine the location of UAV 230-3. Since UAV 230-3 is outside of restricted airspaces 240, it may function normally and be controlled by a pilot of UAV 230-3 via a pilot control system. Similarly, UAV 230-4 has left restricted airspace 240-2 and may continue to have its transponder system interrogated by system 250-1 and 250-2, such as to determine the location of UAV 230-4. Since UAV 230-4 is outside of restricted airspaces 240, it may function normally and be controlled by its pilot via a pilot control system.

While FIGS. 2 and 3 consider management systems being on-site as part of systems 250, it should be understood that the management systems may be located remotely, such as part of a central system operated on a regional or national basis. For instance, a government entity, such as the FAA, may operate one or more management systems that control various restricted airspaces on a local, regional, or national level. Transceivers, however, may be distributed on a local or regional level as necessary to interrogate UAVs that are operating in and near restricted airspace.

Figure 4:
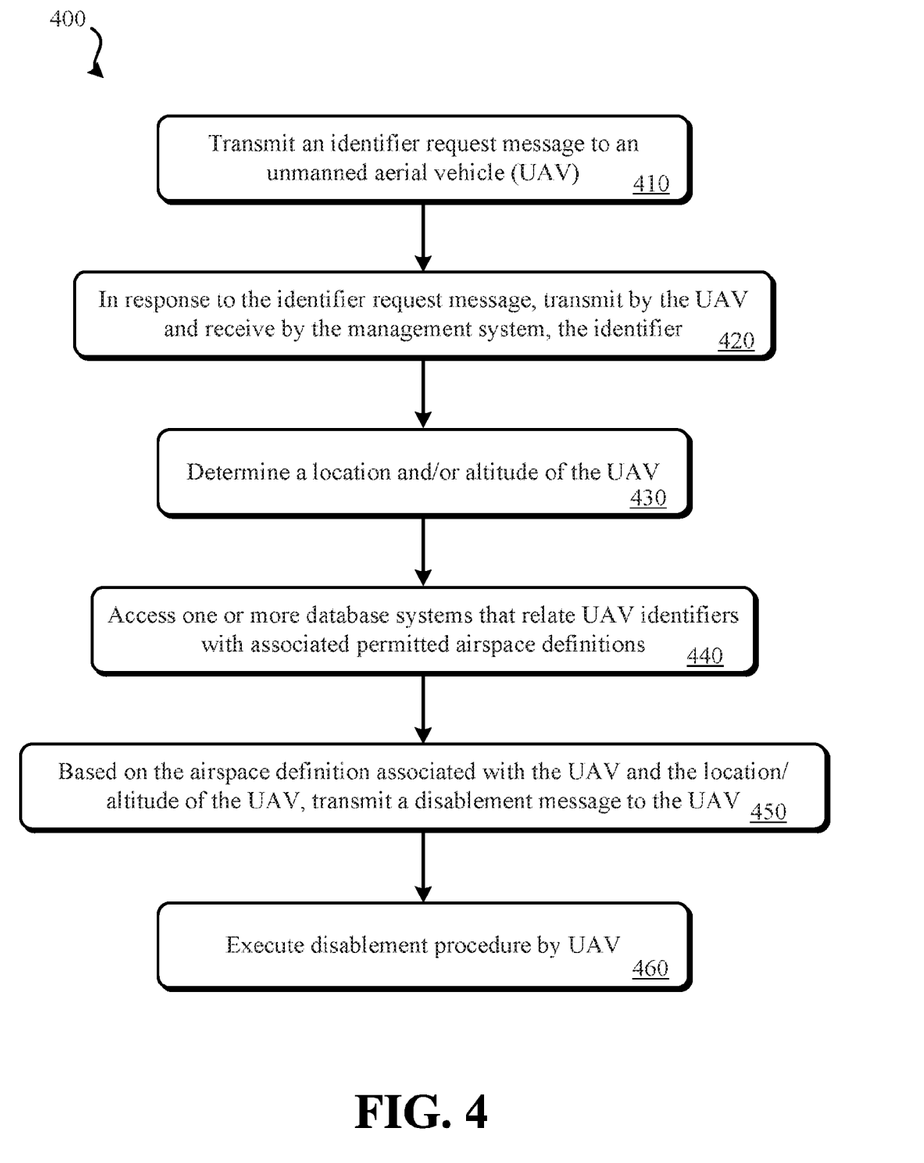
FIG. 4 illustrates an embodiment of a method for interrogating and disabling a UAV.

Various embodiments of system 100 of FIG. 1 may be used to perform various methods. FIG. 4 illustrates an embodiment of a method 400 for interrogating and disabling a UAV. Blocks of method 400 may be performed using one or more components detailed in relation to FIG. 1. For example, the blocks of method 400 may be performed using a ground-based UAV interrogation and airspace management system and transceiver system, such as management system 120 and transceiver 110. As previously detailed, a management system may operate autonomously or in conjunction with an authorized user's input. During autonomous operation, a management system may interrogate and disable UAVs without input from an authorized user. In other embodiments or in a different operating mode, a management system may require an authorized user's input in order to: 1) interrogate one or more UAVs; and/or 2) disable one or more UAVs.

At block 410, an identifier request message may be transmitted to a UAV. This request message may be transmitted by a management system via a transmitter system or transceiver system. This identifier request message may be broadcast and intended for all UAVs that happen to be within range to receive the message; alternatively, the identifier request message may be targeted to a particular UAV. The UAV may be configured to receive such messages in a particular format on a particular frequency or frequency range.

At block 420, in response to receiving the identifier request message, the UAV may receive and process the message. The UAV may then, in response, transmit an identifier of the UAV. This identifier may be unique to the UAV as compared to identifiers assigned to other UAVs (e.g., globally or within a particular jurisdiction, such as the United States). The identifier stored by the UAV may be read-only and not permitted to be modified by an owner or operator of the UAV. Also at block 420, this identifier may be received via a ground-based receiver or transceiver system and received by the management system.

At block 430, the location (e.g., latitude and longitude, or other form of coordinates), altitude, and/or heading of the UAV may be determined. The determination of the location, altitude, and/or heading may be based on the UAV including location information in the identifier message transmitted to the management system at block 420 or as part of a separate message. This location information may be determined using a GNSS receiver located on-board the UAV. In other embodiments, the location, altitude, and/or heading of the UAV may be determined using a radar system of the management system.

At block 440, one or more databases may be accessed to determine whether the UAV has one or more exemptions to fly in airspaces defined as restricted. This may involve accessing one or more local access UAV databases and/or one or more restricted access UAV databases. Based on accessing such databases, the management system may determine if the UAV has an exemption to fly within one or more restricted airspaces that are under the control of the management system.

At block 450, the management system may transmit a disablement message to the UAV based on the location of the UAV, the analysis of the one or more databases of block 440, and a stored definition of restricted airspace that is controlled by the management system. If the UAV is within the restricted airspace and the UAV does not have an applicable exemption to fly within the restricted airspace, the UAV may be eligible to be disabled. In some embodiments, when a UAV is eligible to be disabled, the final approval for disabling the UAV may be provided to an operator of the management system. Such an option being provided to an operator may be contingent on the UAV being determined to be within the restricted airspace and, possibly, the UAV not having an applicable exemption for the restricted airspace. In some embodiments, block 440 is not performed until it is determined that the UAV is within the restricted airspace managed by the management system.

At block 460, in response to receiving a disablement message, the UAV may at least partially disable its functionality, including control by the UAV's pilot. The disablement message may specify a type of disablement, such as a gradual decrease of power, a flight path retrace, or some other form of disablement of the UAV that removes at least some flight control from the pilot of the UAV. The UAV may be manufactured and/or programmed such that the disablement message cannot be ignored and must be enforced. In response to a disablement message being sent, the management system may keep a record of such a disablement message being sent in a local access UAV database or some other data storage arrangement. This record may also be sent to a remote restricted access UAV database.

Figure 5:
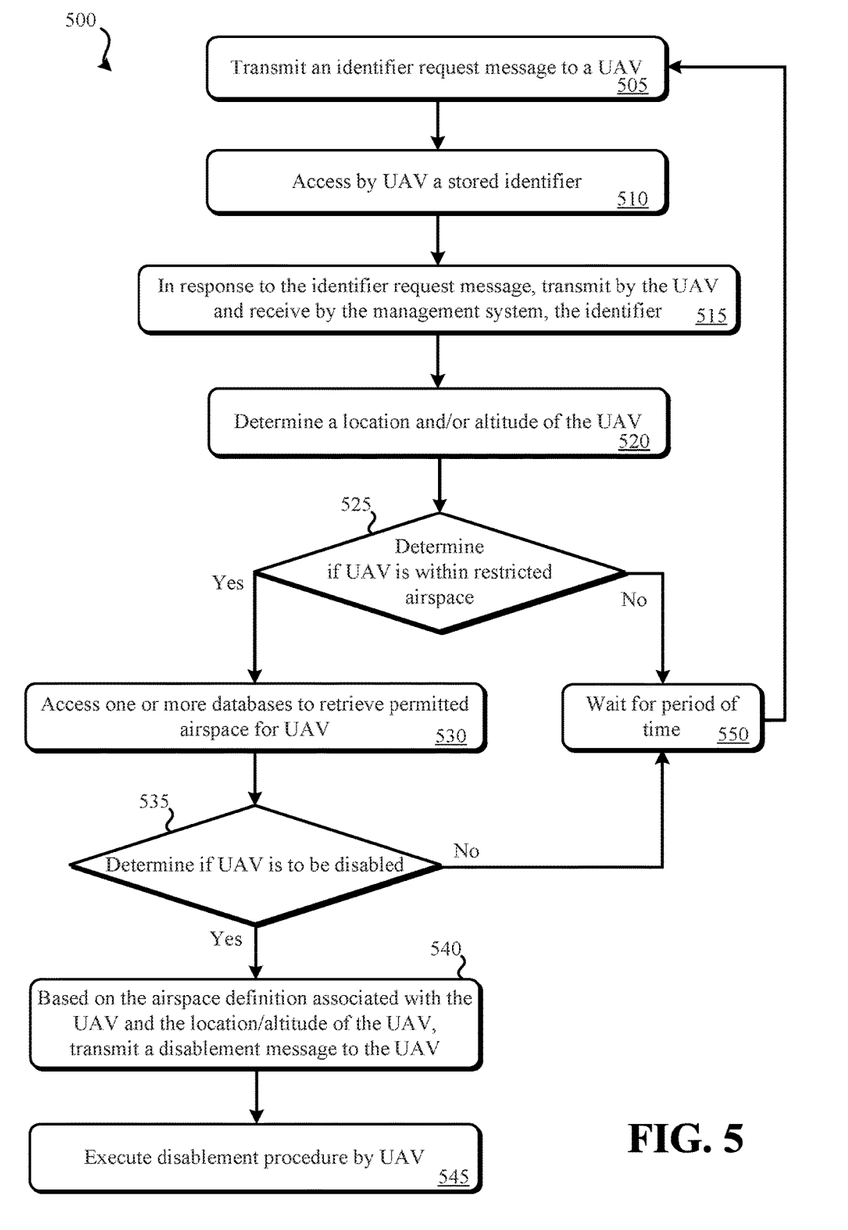
FIG. 5 illustrates another embodiment of a method for interrogating and disabling a UAV.

FIG. 5 illustrates an embodiment of a method 500 for interrogating and disabling a UAV. Blocks of method 500 may be performed using one or more components detailed in relation to FIG. 1. For example, the blocks of method 500 may be performed using a ground-based UAV interrogation and airspace management system and transceiver system, such as management system 120 and transceiver 110. Method 500 can represent a more detailed embodiment of method 400 of FIG. 4.

At block 505, an identifier request message may be transmitted to a UAV. This request message may be transmitted by a management system via a transmitter system or transceiver system. This identifier request message may be broadcast and intended for all UAVs that happen to be within range to receive the message; alternatively, the identifier request message may be targeted to a particular UAV. The UAV may be configured to receive such messages in a particular format on a particular frequency or frequency range.

At block 510, in response to receiving the identifier request message, the UAV may receive and process the message and access the stored identifier of the UAV. The identifier stored by the UAV may be read-only and not permitted to be modified by an owner or operator of the UAV. The UAV may then, in response, transmit an identifier of the UAV at block 515. This identifier may be unique to the UAV as compared to identifiers assigned to other UAVs (e.g., globally or within a particular jurisdiction, such as the United States). Also at block 515, this identifier may be received via a receiver or transceiver system and received by the management system.

At block 520, the location (e.g., latitude and longitude, or other form of coordinates) of the UAV may be determined. In some embodiments, this location may include an altitude. The determination of the location may be based on the UAV including location information in the identifier message transmitted to the management system at block 515 or as part of a separate message. This location information may be determined using a GNSS receiver located onboard the UAV. In other embodiments, the location of the UAV may be determined using a radar system of the management system or some other location-determination system distinct from the UAV.

At block 525, the management system may determine whether the UAV is within restricted airspace based on a definition of restricted airspace stored by the management system and the location (and, possibly, altitude) determined at block 520. If yes, method 500 may proceed to block 530. If no, at block 550, method 500 may be repeated after an amount of time (e.g., to reevaluate whether the UAV has entered the restricted airspace).

At block 530, one or more databases may be accessed by the management system to determine whether the UAV has one or more exemptions to fly in airspaces defined as restricted. This may involve accessing one or more local access UAV databases and/or one or more restricted access UAV databases. One or more of such databases may be access-restricted and require access credentials in order to determine if the UAV has an exemption. Based on accessing such databases, the management system may determine if the UAV has an exemption to fly within one or more restricted airspaces that are under the control of the management system. At block 535, the management system may determine whether the UAV has a valid exemption for flying within the restricted airspace. If there is a valid exemption, method 500 may proceed to block 550.

If there is no valid exemption for the restricted airspace determined at block 535, method 500 may proceed to block 540. At block 540, the management system may transmit a disablement message to the UAV. Prior to transmitting the disablement message, an encryption key or code may be retrieved from a database, such as a restricted-access database. This encryption key or code may correspond to the UAV. For the disablement message to be recognized and/or executed by the UAV, the use of the proper encryption key or code may be required. In some embodiments, when an UAV is eligible to be disabled, the final approval for disabling the UAV may be provided to an operator of the management system. Such an option being provided to an operator may be contingent on the UAV being determined to be within the restricted airspace and, possibly, the UAV not having an applicable exemption for the restricted airspace.

At block 545, in response to receiving the disablement message, the UAV may evaluate the code and/or encryption key to verify authenticity. An authentic disablement message may be enforced by the UAV. The disablement message may specify a type of disablement to be performed by the UAV, such as a gradual decrease of power, a flight path retrace, or some other form of disablement of the UAV that removes at least some flight control from the pilot of the UAV. The UAV may enforce the form of disablement received in the disablement message. The UAV may be manufactured and/or programmed such that the disablement message cannot be ignored and must be enforced.

Figure 6:
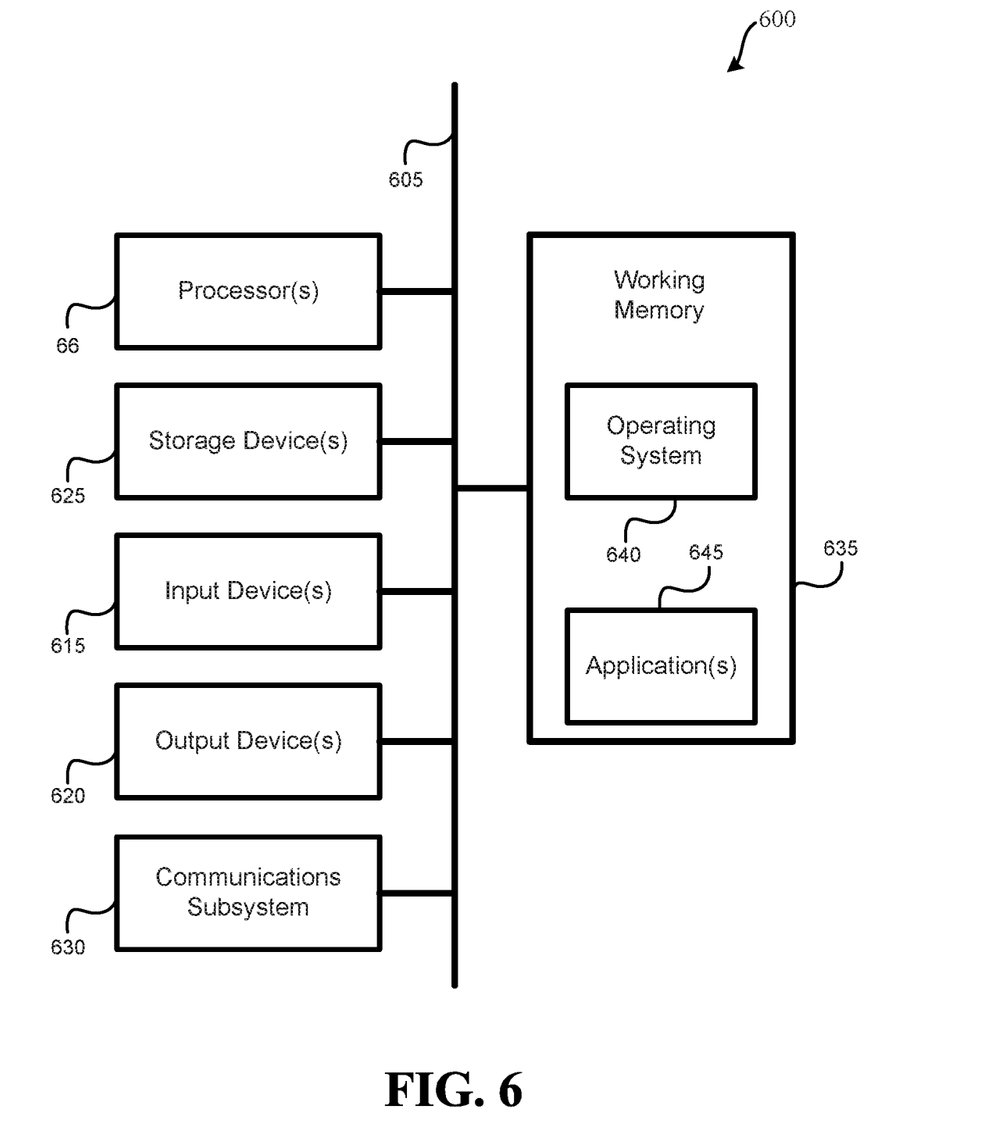
FIG. 6 illustrates a computer system that can be incorporated as part of a UAV and/or ground-based UAV interrogation and airspace management system.

FIG. 6 illustrates a computer system that can be incorporated as part of a UAV and/or ground-based UAV interrogation and airspace management system. A computer system as illustrated in FIG. 6 may be incorporated as part of the previously described computerized devices, such as the management systems and UAVs. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a touchscreen, keyboard, remote control, and/or the like; and one or more output devices 620, which can include without limitation a display device, a printer, etc.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for interrogating and disabling an unmanned aerial vehicle (UAV), the system comprising:
    a ground-based interrogation system, comprising: a wireless transmitter, a wireless receiver, and an interrogation server system, wherein:
        the ground-based interrogation system is distinct and separate from a pilot control system that is used to control flight of the UAV from a remote location, the pilot control system not being in communication with the ground-based interrogation system;
        the interrogation server system comprises one or more processors; and a memory communicatively coupled with and readable by the one or more processors and having stored therein processor-readable instructions which, when executed by the one or more processors, cause the one or more processors to:
            transmit an identifier request message to the UAV using the wireless transmitter, wherein the UAV is in flight and is piloted using the pilot control system distinct from the ground-based interrogation system when the identifier request message is transmitted to the UAV;
            receive, in response to the identifier request message, a response message using the wireless receiver, the response message comprising a UAV identifier, wherein the UAV identifier distinguishes the UAV from other UAVs;
            while the UAV is in flight and in response to the response message from the UAV, access a plurality of UAV identifier databases that relate UAV identifiers with airspace definitions, wherein:
                the plurality of UAV identifier databases comprises a first UAV identifier database that is stored locally by the interrogation server system and defines only UAV identifiers that are exempted from a restricted airspace controlled by the ground-based interrogation system; and
                the plurality of UAV identifier databases comprises a second UAV identifier database that is accessed via the Internet using login credentials and that stores information on all UAVs registered in a given jurisdiction;
            while the UAV is in flight and in response to the response message from the UAV, retrieve from the plurality of UAV identifier databases an airspace definition corresponding to the UAV identifier, wherein:
                the airspace definition corresponding to the UAV identifier indicates that the UAV is not permitted to fly in the restricted airspace;
            determine that the UAV is to be disabled based on: a location of the UAV, the restricted airspace definition, and the airspace definition corresponding to the UAV identifier; and
            transmit a disablement instruction message to the UAV via the wireless transmitter based on determining that the UAV is to be disabled based on the location of the UAV and the airspace definition corresponding to the UAV identifier, wherein the disablement instruction message disables control of the UAV by the pilot and the pilot control system.

2. The system for interrogating and disabling the UAV of claim 1, the system further comprising:
    a UAV disablement control module integrated on-board the UAV, wherein the UAV disablement control module, in response to a disablement instruction message, severs control of the UAV from a remote pilot system and executes a UAV disablement procedure.

3. The system for interrogating and disabling the UAV of claim 1, wherein the processor-readable instructions, when executed, further cause the one or more processors to: transmit login credentials to the second UAV identifier database.

4. The system for interrogating and disabling the UAV of claim 3, wherein the processor-readable instructions, when executed, further cause the one or more processors to: retrieve, from the second UAV identifier database, an encryption key specific to the UAV identifier.

5. The system for interrogating and disabling the UAV of claim 4, wherein the disablement instruction message transmitted to the UAV is encrypted using the encryption key specific to the UAV identifier retrieved from the second UAV identifier database.

6. The system for interrogating and disabling the UAV of claim 1, wherein the disablement instruction message transmitted to the UAV indicates a specific type of disablement selected from a plurality of types of disablement.

7. The system for interrogating and disabling the UAV of claim 1, wherein the airspace definition defines a standardized list of airspaces in which the UAV is not permitted to fly.

8. The system for interrogating and disabling the UAV of claim 7, wherein the airspace definition further defines one or more exceptions to the standardized list of airspaces, the one or more exceptions defining one or more restricted airspaces in which the UAV is permitted to fly.

9. A method for interrogating and disabling an unmanned aerial vehicle (UAV), the method comprising:
   transmitting, by an airspace management system, an identifier request message to the UAV via a wireless transmitter of a ground-based interrogation system, wherein:
      the UAV is in flight when the identifier request message is transmitted to the UAV;
      the ground-based interrogation system is distinct and separate from a pilot control system that is used to control flight of the UAV from a remote location, the pilot control system not being in communication with the ground-based interrogation system;
   while the UAV is in flight, receiving, by the airspace management system, in response to the identifier request message, a response message using a wireless receiver, the response message comprising a UAV identifier, wherein the UAV identifier distinguishes the UAV from other UAVs;
   while the UAV is in flight and in response to the response message from the UAV, accessing, by the airspace management system, a plurality of UAV identifier databases that relate UAV identifiers with airspace definitions, wherein:
      the plurality of UAV identifier databases comprises a first UAV identifier database that is stored locally by the ground-based interrogation system and defines only UAV identifiers that are exempted from a restricted airspace controlled by the ground-based interrogation system; and
      the plurality of UAV identifier databases comprises a second UAV identifier database that is accessed via the Internet using login credentials and that stores information on all UAVs registered in a given jurisdiction;
   while the UAV is in flight and in response to the response message from the UAV, retrieving, by the airspace management system, from the plurality of UAV identifier databases an airspace definition corresponding to the UAV identifier, wherein:
      the plurality of UAV identifier databases store a plurality of airspace definitions that permit one or more UAVs to fly in a restricted airspace defined by a restricted airspace definition and deny access for one or more other UAVs to the restricted airspace defined by the restricted airspace definition; and
      the airspace definition corresponding to the UAV identifier indicates that the UAV is not permitted to fly in the restricted airspace;
   determining, by the airspace management system, that the UAV is to be disabled based on: a location of the UAV, the restricted airspace definition, and the airspace definition corresponding to the UAV identifier; and
   transmitting, by the airspace management system, a disablement instruction message to the UAV via the wireless transmitter based on determining that the UAV is to be disabled based on the location of the UAV and the airspace definition corresponding to the UAV identifier, wherein the disablement instruction message disables control of the UAV by the pilot and the pilot control system.

10. The method for interrogating and disabling the UAV of claim 9, the method further comprising:
   deactivating, by the UAV, in response to the disablement instruction message, control of the UAV from a remote pilot system; and
   executing, by the UAV, a UAV disablement procedure.

11. The method for interrogating and disabling the UAV of claim 9, further comprising transmitting, by the airspace management system, login credentials to the second UAV identifier database.

12. The method for interrogating and disabling the UAV of claim 11, further comprising: retrieving, by the airspace management system, from the second UAV identifier database, an encryption key specific to the UAV identifier.

13. The method for interrogating and disabling the UAV of claim 12, wherein the disablement instruction message transmitted to the UAV is encrypted using the encryption key specific to the UAV identifier retrieved from the second UAV identifier database.

14. The method for interrogating and disabling the UAV of claim 9, further comprising:
   selecting, by the airspace management system, a specific type of disablement selected from a plurality of types of disablement, wherein the disablement instruction message transmitted to the UAV indicates the specific type of disablement selected from the plurality of types of disablement.

15. The method for interrogating and disabling the UAV of claim 9, wherein the airspace definition defines a standardized list of airspaces in which the UAV is not permitted to fly.

16. The method for interrogating and disabling the UAV of claim 15, wherein the airspace definition further defines one or more exceptions to the standardized list of airspaces, the one or more exceptions defining one or more restricted airspaces in which the UAV is permitted to fly.

17. A non-transitory processor-readable medium comprising processor-readable instructions that cause one or more processors of a ground-based interrogation system to:
   transmit an identifier request message to a UAV using a wireless transmitter of the ground-based interrogation system, wherein:
      the UAV is in flight when the identifier request message is transmitted to the UAV;
      the ground-based interrogation system is distinct and separate from a pilot control system that is used to control flight of the UAV from a remote location, the pilot control system not being in communication with the ground-based interrogation system;
   while the UAV is in flight, receive, via a wireless receiver of the ground-based interrogation system, in response to the identifier request message, a response message comprising a UAV identifier, wherein the UAV identifier distinguishes the UAV from other UAVs;
   while the UAV is in flight and in response to the response message from the UAV, access a plurality of UAV identifier databases that relate UAV identifiers with airspace definitions, wherein:
  the plurality of UAV identifier databases comprises a first UAV identifier database that is stored locally by the ground-based interrogation system and defines only UAV identifiers that are exempted from a restricted airspace controlled by the ground-based interrogation system; and
  the plurality of UAV identifier databases comprises a second UAV identifier database that is accessed via the Internet using login credentials and that stores information on all UAVs registered in a given jurisdiction;
while the UAV is in flight and in response to the response message from the UAV, retrieve from the plurality of UAV identifier databases an airspace definition corresponding to the UAV identifier, wherein:
  the plurality of UAV identifier databases store a plurality of airspace definitions that permit one or more UAVs to fly in a restricted airspace defined by a restricted airspace definition and deny access for one or more other UAVs to the restricted airspace defined by the restricted airspace definition; and
  the airspace definition corresponding to the UAV identifier indicates that the UAV is not permitted to fly in the restricted airspace;
determine that the UAV is to be disabled based on: a location of the UAV, the restricted airspace definition, and the airspace definition corresponding to the UAV identifier; and
transmit, via the wireless transmitted of the ground-based interrogation system, a disablement instruction message to the UAV via the wireless transmitter based on determining that the UAV is to be disabled based on the location of the UAV and the airspace definition corresponding to the UAV identifier, wherein the disablement instruction message disables control of the UAV by the pilot and the pilot control system.

18. The non-transitory processor-readable medium of claim 17 wherein the processor-readable instructions further cause the one or more processors to encrypt the disablement instruction message to be transmitted to the UAV using an encryption key specific to the UAV identifier retrieved from the second UAV identifier database.

\* \* \* \* \*